United States Patent [19]

Bartkus

[11] Patent Number: 4,772,165
[45] Date of Patent: Sep. 20, 1988

[54] LOAD RESTRAINING APPARATUS FOR VEHICLES

[76] Inventor: Jimmie Bartkus, 5721 S. Division Ave., Grand Rapids, Mich. 49508

[21] Appl. No.: 919,063

[22] Filed: Oct. 14, 1986

[51] Int. Cl.$^4$ ............................................. B60P 7/06
[52] U.S. Cl. .................................. 410/139; 410/145; 410/150; 224/42.38; 211/7; 211/94.5
[58] Field of Search ............ 410/121, 129, 130, 132, 410/139, 140–145, 150; 224/42.32, 42.38, 311; 211/7, 94.5, 105.1, 175

[56] References Cited

U.S. PATENT DOCUMENTS

| | | | |
|---|---|---|---|
| 1,963,981 | 6/1934 | Garrett | 25/131 |
| 2,016,702 | 10/1935 | Bauer | 20/92 |
| 2,546,929 | 3/1951 | Nampa | 105/369 |
| 2,608,420 | 8/1952 | Eck | 280/179 |
| 2,919,662 | 1/1960 | Tobin | 105/369 |
| 2,977,899 | 4/1961 | Doherty et al. | 105/369 |
| 3,051,099 | 8/1962 | Robertson | 105/369 |
| 3,052,485 | 9/1962 | Keener | 280/179 |
| 3,130,689 | 4/1964 | Johnston | 105/369 |
| 3,199,464 | 8/1965 | Shook | 211/175 |
| 3,229,994 | 1/1966 | Klein | 280/179 |
| 3,721,200 | 3/1973 | Schmidt | 105/369 |
| 4,236,854 | 12/1980 | Rogers | 410/121 |
| 4,256,425 | 3/1981 | Burgess et al. | 440/150 X |
| 4,261,470 | 4/1981 | Dolan | 211/191 |
| 4,343,578 | 8/1982 | Barnes | 410/151 |
| 4,502,619 | 3/1985 | Cox | 410/121 X |
| 4,525,971 | 7/1985 | Kern | 52/484 |
| 4,650,383 | 3/1987 | Hoff | 410/150 X |

FOREIGN PATENT DOCUMENTS

651236 3/1951 United Kingdom .

Primary Examiner—Johnny D. Cherry
Assistant Examiner—Russell D. Stormer
Attorney, Agent, or Firm—Price, Heneveld, Cooper, DeWitt & Litton

[57] ABSTRACT

A load/cargo restraining apparatus and kit for same for vehicles such as pick-up trucks, vans and the like including a pair of opposing, parallel support rails having spaced holes therethrough positioned outwardly from opposing walls of the truck and a rigid, elongated cross member fitted between the rails and having an extending pin at either end. Each pin is received through one hole in a support rail. A removable fastener is secured to each pin in the space between the rail and wall whereby no pressure is exerted by the cross member or pins against either wall. A second cross member may be secured between the rails at a spaced position from the first cross member to help support one or more rigid, elongated brace members which prevent lateral shifting of loads. Vertically oriented restraining members may be secured to each cross member to support another horizontal support member above or below the cross member to resist shifting of taller or shorter cargo.

44 Claims, 4 Drawing Sheets

LOAD RESTRAINING APPARATUS FOR VEHICLES

BACKGROUND OF THE INVENTION

This invention relates to cargo and/or load restraining devices for preventing the shifting of loads or cargo in pick-up trucks, vans or other vehicles and, more particularly, to a load restraining apparatus and kit for same which may be easily secured within the cargo area to efficiently support and prevent shifting of the loads or cargo.

A common problem with the carrying of freight or cargo in trucks such as pick-ups and vans is the shifting or movement of the load or cargo when driving, especially with less than a full load. In such cases, a single item or small numbers of items can shift from side-to-side or backwardly and forwardly and even bounce out of an open pick-up truck or van into the paths of other vehicles during sudden stops, starts or turns. Such loads can even slide forwardly against the back of the cab of a pick-up or driver's area of a van. The result is either damage to the cargo or injury to the driver or other passengers.

In the past, various devices have been proposed to prevent the shifting and movement of loads in trucks and other vehicles. Exemplary of these are the load bracing structures or cross bars for vehicles disclosed in Eck U.S. Pat. No. 2,608,420, Doherty et al. U.S. Pat. No. 2,977,899 and Schmidt U.S. Pat. No. 3,721,200. Eck discloses telescoping safety bars in a truck extending between side supports and having internal springs forcing pins outwardly to engage the side supports. Doherty et al. and Schmidt disclose similar structures relying on outwardly biased telescoping pins for engaging side supports. Not only are the cross members in these structures subject to failure and release should the internal springs which force the pins outwardly break or weaken, but the structures exert significant force outwardly against the side supports and sides of the truck in order to retain the cross bars in place. Such force can be large especially when heavy cargo must be carried. Thus, the structures are unsuitable for many light duty applications and smaller pick-up trucks having sidewalls which are insufficient to support such forces.

Other prior structures such as those shown in Johnston U.S. Pat. No. 3,130,689 and Robertson U.S. Pat. No. 3,051,099 disclose cross bars supported by the weight of gravity on side supports. Should a large jolt or bump be encountered during driving, such cross bars could well be moved out of position and fail to properly secure loads against shifting and movement.

In yet other structures such as Barnes U.S. Pat. No. 4,343,578 and Rogers U.S. Pat. No. 4,236,854, both of which disclose load bracing assemblies relying wholly or in part on pressure exerted against the sides of a truck bed or the like, failure of the mechanisms to maintain the outward pressure against the truck sides will result in failure to retain the loads against movement. In addition, the structure of Rogers is supported on the floor of the truck bed well within the sides of the truck cargo area thereby limiting support area for cargo and wasting significant cargo hauling space.

In yet other prior structures such as the cargo loading and storage apparatus of the type shown in Tobin U.S. Pat. No. 2,919,662, vertical and horizontal columns and cross members are positioned in specific locations making adjustment extremely difficult and preventing easy accommodation of various size loads and cargo.

Yet other structures such as the freight loading apparatus in Nampa U.S. Pat. No. 2,546,929 require the attachment of both vertical and horizontal side supports within a cargo support area of a vehicle before cross supports can be secured to support cargo therein. Such apparatus is significantly more complicated to install but still does not provide the secure attachment of the present invention.

Accordingly, the present invention was conceived in recognition of and as a solution for these and other problems evident from cargo hauling problems and the prior vehicular cargo restraining or bracing structures.

SUMMARY OF THE INVENTION

Accordingly, the present invention provides a simple yet durable load/cargo restraining apparatus useful in vehicles such as pick-up trucks, vans and the like which will prevent the shifting and movement of cargo or loads within a cargo support area in a strong, secure and efficient manner, and yet may be easily removed and stored without obscuring the size or extent of the cargo area in such vehicles.

In one form, the invention is a load/cargo restraining apparatus for vehicles of the type including a cargo area having opposed, upstanding walls and a cargo supporting floor. The apparatus includes a pair of opposing, elongated, rigid support rails each having a series of support holes therethrough at spaced locations and a rigid, elongated, load restraining cross member mounted on and extending between the side rails. The rails are adapted for mounting parallel with one another on the opposing walls of the cargo area of a vehicle. Securing means are included for attaching each of the rails to one of the walls at a position spaced outwardly from that wall. The rails are aligned with one another across the cargo area such that the respective pairs of support holes in the opposing rails are aligned with one another. The spaces between each of the rails and its respective wall are accessible from adjacent the rails. The cross member includes a pair of mounting pins, one pin extending from each end. The pins extend through one support hole in a selected pair of the support holes in the rails and into the space between the rail and its respective wall such that each pin is spaced from the wall and accessible in that space. Removable fastening means are mounted on each of the pins between the rail and its respective wall for retaining the pins in the support holes and the cross members on the rails. The fastening means are accessible for attachment and removal in the space from adjacent the rails. Thus, when a load or cargo is positioned adjacent the cross member in the cargo area, it will be supported and restrained against movement without pressure being exerted by the cross member against the walls of the cargo area.

Preferably, the pins are slidably mounted for telescoping movement in the ends of the cross member on a pin support which cannot pass through the openings in the side rail. The removable fastening means preferably include a pin aperture extending through the pin adjacent its outer end and a resilient spring clip having a length greater than the maximum width of any of the support holes such that the pin is positively prevented from withdrawal from the holes.

In other aspects of the invention, a second of the cross members is positioned between another pair of the support holes in the support rails at a position spaced from the first cross member and receives an elongated, rigid brace member mounted on and extending between and generally perpendicular to the two cross members. The brace member includes releasable clamping means engaging each of the cross members for retaining that brace member in its desired position to resist movement of the loads or cargo in a direction parallel to the cross members. Such brace members are preferably hollow tubular members which may be telescopically adjusted in length. The releasable clamping means preferably include a bracket and a threaded fastening member extending through the bracket for clampingly engaging the exterior of the cross members.

In yet another aspect of the invention, a pair of spaced, elongated rigid retaining members are mounted on at least one of the cross members and extend perpendicularly from the plane including the cross members and/or brace member. The retaining members include releasable clamping means for engaging the cross member and for holding an elongated, rigid support member in a position spaced from the cross member. Thus, a cargo or load extending beyond the first plane, i.e., above or below the cross members in the preferred embodiment, may be restrained against movement.

The invention also encompasses a kit for assembling a load/cargo restraining apparatus of the above type including a pair of the elongated, rigid support rails, securing means for attaching each of the rails to walls of a cargo support area, a pair of elongated, rigid load restraining cross members adapted to be mounted on and to extend between the support rails, and removable fastening means for mounting on each of the pins in the space between the rail and its respective wall to retain the pins in the support holes and the cross members on the rails when assembled. Elongated, rigid brace members, retaining members and support members like those described above may also be included in the kit.

The present invention provides numerous advantages not obtained with prior known vehicular load restraining or bracing structures. The present invention does not rely on the strength of the truck sides or cargo bed since its cargo engaging cross members exert no pressure directly on the truck bed sides. No springs or biasing members are included which might push outwardly against such sides. Thus, the present invention is especially adaptable for use in modern, light duty pick-up trucks or the like which do not include substantial bracing or strength in cargo bed sides. However, strong joints are provided between the various members of the apparatus to effectively counter the principal start/stop motion and lateral turning motions of a truck when being driven.

In addition, the present apparatus is significantly simpler and more durable than prior bracing structures. It is easily adaptable to numerous kinds and sizes of loads and will easily support both tall and short loads using the restraining members and additional support bars. Further, the cross members, brace members, restraining members and support members may be positioned immediately adjacent the loads to prevent the load from starting to move and thereby gaining momentum which could break or damage the restraining apparatus.

The present restraining apparatus can be positioned virtually anywhere within the cargo area to provide support for cargo standing or resting on virtually any portion of the floor of the cargo area. The combination of rails, braces and restraining members also protect the inside of the truck or other vehicle and prevent the truck from being bent or damaged by shifting loads. The apparatus also protects the load or cargo itself from damage and prevents the loads from shifting and moving into driver or passenger carrying areas thus preventing injury to such persons. The structure does not require the use of any tailgate within the truck for support purposes and can be easily removed leaving only the side support rails which do not interfere with the loading or carrying of large cargo such as plywood sheets or the mounting of camper tops or the like.

These and other objects, advantages, purposes and features of the invention will become more apparent from a study of the following description taken into conjunction with the drawings.

DESCRIPTION OF THE PREFERRED EMBODIMENTS

Figure 1:
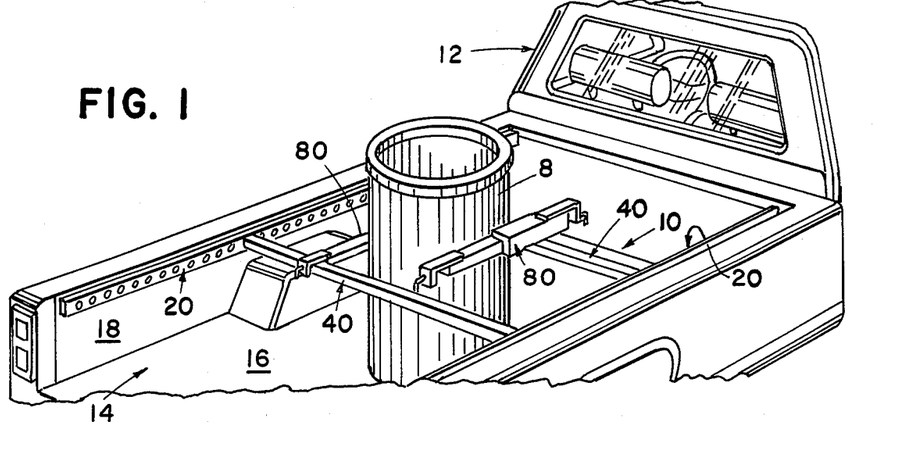
FIG. 1 is a fragmentary perspective view of a typical pick-up truck incorporating a first embodiment of the load/cargo restraining apparatus of the present invention.

Referring now to the drawings in greater detail, FIG. 1 illustrates a first arrangement 10 of the load/cargo restraining apparatus of the present invention and adapted for use in various vehicles. Apparatus 10 is shown installed in a typical pick-up truck 12 having an open cargo carrying area or bay 14 including a cargo supporting floor 16 and opposed, parallel, upstanding sidewalls 18. The restraining apparatus 10 in FIG. 1 is the basic arrangement and includes three principal elements, namely, a pair of opposed, generally parallel, horizontally extending, side support rails 20, a pair of generally parallel, horizontal, rigid cross members 40 supported on side rails 20, and a pair of generally parallel, horizontally extending, rigid brace members 80 supported on cross members 40. When arranged as shown in FIG. 1, cross members 40 and brace members 80 fit immediately adjacent or against the supported cargo or load, such as upstanding barrel B, which may be positioned substantially anywhere on cargo support floor 16 and still be fully and adequately supported by the restraining apparatus 10 which may be positioned anywhere over and along that floor on side rails 20. The restraining apparatus 10 provides a strong secure support for such cargo to prevent its shifting and movement along floor 16 during transportation with truck 12.

The joint between side rails 20 and cross members 40 is particularly strong to resist the major forward/backward longitudinal forces imposed generally perpendicularly to cross members 40 during starting and stopping of the truck. However, brace members 80, which are clamped in position on the exterior of cross members 40, also provide strong, secure lateral resistance to movement of the load B such as when the truck is driven around corners and through curves. Moreover, as will be explained in connection with FIGS. 19–23, the restraining apparatus is adaptable to various arrangements to support odd sized loads such as tires and the like, or taller or shorter loads which extend above or below the level of cross members 40. It will also be understood that the present restraining apparatus is fully adaptable to other types of vehicles besides pick-up trucks such as enclosed vans, semi-trailers, railroad boxcars, aircraft, ships or the like, and may even be used in stationary storage or cargo holding areas such as warehouses.

Figure 15:
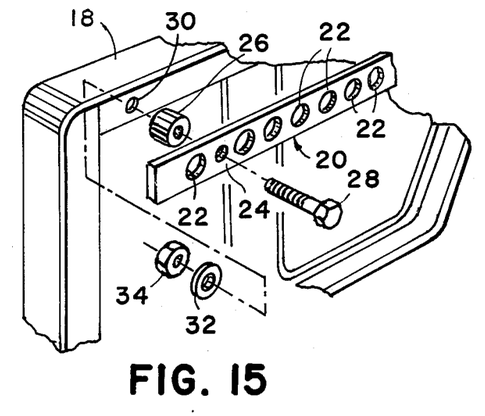
FIG. 15 is a fragmentary, exploded, perspective view of one sidewall of a pick-up truck cargo area showing attachment of one side support rail to that wall.
Figure 16:
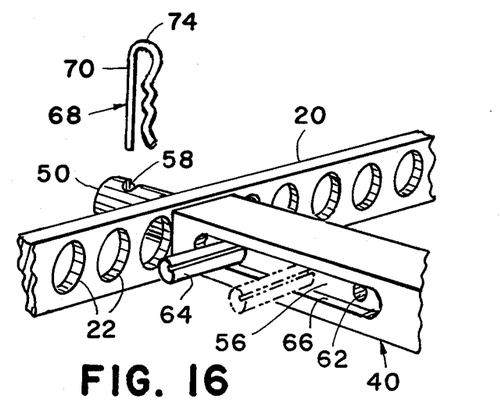
FIG. 16 is a fragmentary, perspective view of one cross member inserted in one side support rail.
Figure 17:
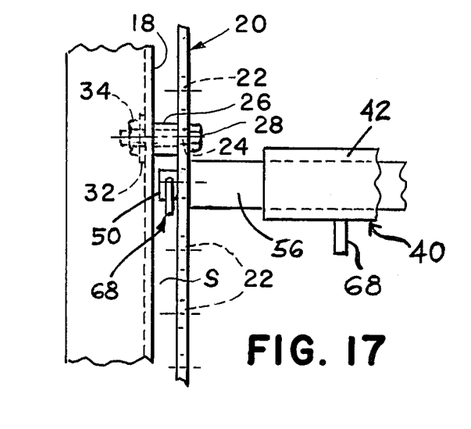
FIG. 17 is a fragmentary, top plan view of the attachment of one cross member to one of the side support rails.

As shown in FIGS. 1 and 15–17, side support rails 20 each include an elongated, rigid, generally flat bar preferably formed from cold rolled steel or the like having a thickness less than its width or height and having a length slightly less than the full length of the pick-up truck bed or cargo area into which it is to be fitted. A series of support holes 22 are bored at spaced intervals through each rail along the entire length of each rail 20, while a plurality of smaller mounting holes 24 are spaced along the length of the rail. When installed in accordance with the concept of this invention, rails 20 are spaced outwardly from sidewalls 18 of the cargo area 14 of pick-up truck 12 as is best seen in FIG. 17. To provide such mounting, a rigid, cylindrical spacer bushing 26 is provided for each of the mounting holes 24. A threaded bolt or fastener 28 is inserted through hole 24, the central bore of bushing 26 and through hole 30 provided in the overhang area of sidewall 18 of truck 12 for fastening with a flat washer 32 and nut 34 as shown in FIGS. 15 and 17. Accordingly, when so arranged, rails 20 will extend substantially horizontally for the full length of cargo bay 14 along the sidewalls 18 of truck 12 and will be spaced toward the interior of the cargo bay from walls 18 by a distance S equivalent to the length of spacer 26 as shown in FIG. 17. Preferably, such rails are also mounted near the top of wall 18 and are also unobstructed along their top and bottom edges such that the space S between the rail and wall will be accessible from the area adjacent the rails 20 and particularly along the top and bottom edges of those rails for insertion and removal of fasteners for retaining the cross members 40 as will be more fully explained below.

Figure 2:
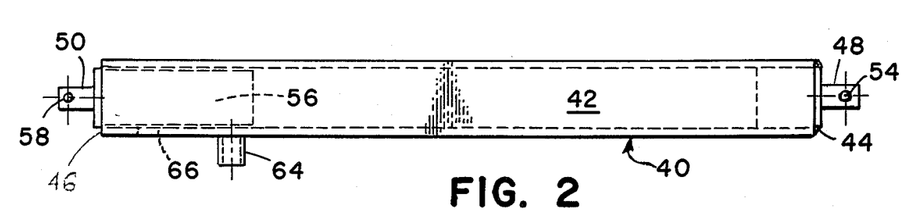
FIG. 2 is a plan view of one of the load restraining cross members of the present invention.
Figure 7:
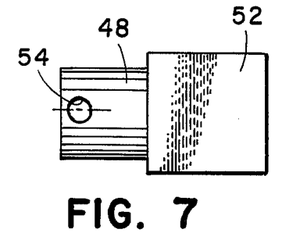
FIG. 7 is a top plan view of a second pin support member at the other end of the cross member of FIGS. 2-4.
Figure 8:
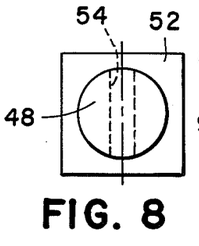
FIG. 8 is an end view of the pin support member of FIG. 7.
Figure 9:
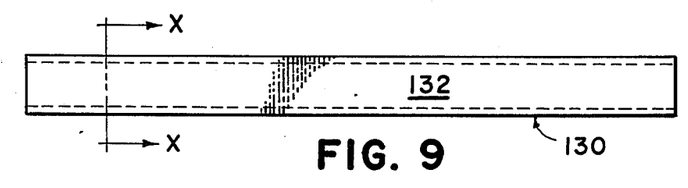
FIG. 9 is a plan view of one of the elongated support members incorporated in the present invention.

Referring now to FIGS. 2–8, each of the elongated, rigid cross members or bars 40 includes an elongated, rigid hollow tube 42 preferably formed from steel and having end surfaces 44, 46 extending generally perpendicularly to the axis of elongation of tube 42. Cylindrical mounting pins 48, 50 extend from either end of tube 42 as shown in FIGS. 2, 7 and 8. Pin 48 is mounted on one end 44 of tube 42 on a solid pin support block 52. Block 52 has the shape of a cube, is larger in dimension than any of support holes 22 in rails 20, and is slidably inserted in end 44 and fixed or secured by welding with its pin supporting face extending slightly out of end 44. Pin 48 includes a cylinder bore 54 extending through one diameter of the pin for receipt of a removable fastener as explained below.

Figure 3:
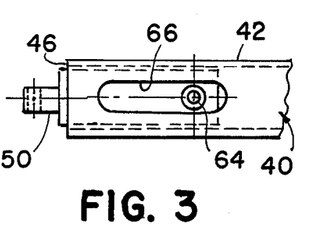
FIG. 3 is a fragmentary side elevation of the left end of the cross member of FIG. 2.
Figure 4:
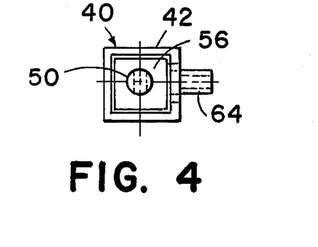
FIG. 4 is an end view of the cross member of FIGS. 2 and 3.
Figure 5:
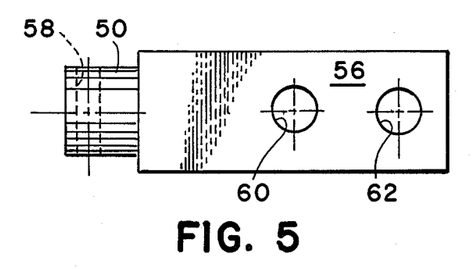
FIG. 5 is a side elevation of the pin support member mounted in the cross member of FIGS. 2-4.
Figure 6:
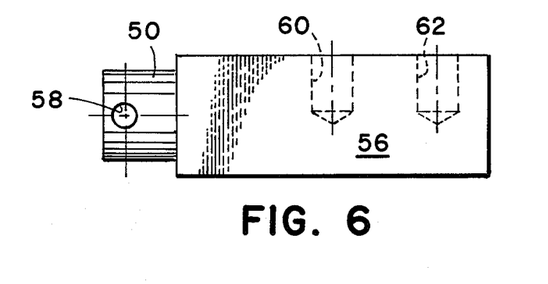
FIG. 6 is a bottom plan view of the pin support member of FIG. 5.

In the opposite end 46 of tube 42 of cross member 40 is slidably mounted an elongated pin support block 56 having cylindrical pin 50 welded or otherwise secured to one end thereof. Like block 52, block 56 has a dimension larger than any of support holes 22. A cylindrical bore 58 extends through one diameter of pin 50 generally parallel to bore 54 in pin 48. Extending into a side surface of block 56 are a series of two or more spaced, blind holes or bores 60, 62 which extend on axes generally perpendicular to the axes of bores 54, 58 in pin 48, 50 of the cross member. One of the bores 60, 62 is adapted to receive a cylindrical, split, spring pin 64 which forms a handle for telescopically sliding pin support 56 and pin 50 in and out of the end 46 of tube 42 to adjust the length of cross member 40 as desired. Spring pin or handle 64 and bores 60, 62 are adapted to register with an elongated aperture 66 extending through one sidewall of tube 42 as is best seen in FIG. 3. Spring pin 64 may be moved from one bore 60 to the other bore 62 depending on the length to which cross member 40 must be extended, i.e., depending on the length to which pin 50 should be moved out of the tube 42. Thus, if greater extension of pin 50 is desired, spring pin 64 is placed in aperture 62 such that when pin support 56 is moved to the left as shown in FIG. 3, the pin support and pin 50 will be moved a greater distance out of the end 46 of tube 42. Should a lesser extension of pin 50 be desired, handle 64 may be placed in bore 60 allowing the pin to be moved farther to the right in FIG. 3 but extend to the left a smaller distance. Similarly, pin support 56 may have a greater length and a third, fourth or additional bores similar to but spaced from bores 60, 62 may be included to provide a greater adjustment range (see FIG. 16). Handle 64 therefore provides a limit or stop which governs the telescoping, sliding movement of pin 50 into and out of end 46 of tube 42 due to its engagement with the ends of aperture 66. In addition, it will be understood that the length of aperture 66 could likewise be extended to provide a greater adjustment range for the extension of pin 50.

As will now be apparent from FIGS. 1, 16 and 17, each of the cross members 40 may be mounted in a selected, opposing pair of aligned support holes 22 in opposing side rails 20 by positioning fixed pin 48 in the support hole 22 on one side of the cargo area 14 and moving the opposite end of cross member 40 into alignment with the opposing support hole 22 in the opposite side rail 20. Slidable pin 50 may then be extended through the appropriate support hole in the opposite side rail by moving pin support 56 with handle 64 until the end surface of the pin support 56 engages the outer surface of rail 20. The length of pin 50 is less tha the distance from the outer surface of rail 20 to the outer surface of wall 18 at the area on which rail 20 is mounted. Accordingly, when the outer surface of pin support 56 engages rail 20, pin 50 will extend through support hole 22 but not reach wall 18. Aperture 58 will thus be exposed and accessible in space S between rail 20 and wall 18 for the fitting of releasable spring clip 68 as shown in FIG. 16.

Spring clip 68 includes a rectilinear shaft 70 integrally connected to resilient, configured shaft 72 by curved end 74 as shown in FIG. 16. Rectilinear shaft 70 is inserted through aperture 58 while the curved outer surface of the pin engages shaft 72 to expand it outwardly against the resistance of curved end 74. The indentations in shaft 72 engage the curved outer surface of the pin adjacent the aperture and hold it in place. The overall length of spring clips 68 is greater than the diameter of support holes 22 such that pin 50 is positively prevented from withdrawal through support holes 22.

Likewise, the opposite end of cross member 40 is also secured in support holes 22 in like manner with pin 48 extending through rail 20 into the space between rail 20 and the opposite sidewall 18 without touching wall 18 for exposure of aperture 54 in the space between the rail and that wall. Another spring clip like 68 is passed through aperture 54 while the face of pin support 52 engages the outer surface of that rail such that withdrawal of pin 48 is positively prevented. Accordingly, cross member 40 is rigidly and positively secured on rails 22 but does not exert any pressure against sidewalls 18 since the ends of the pins 48, 50 are spaced from and do not touch wall 18. The joint between support rails 20 and cross members 40 is strong and secure and cannot fail due to the release of any spring member or pressure exerted outwardly against the rails. Indeed, if cargo forces the cross member laterally, it will tend to maintain pins 48, 50 in place to prevent failure of the restraining apparatus.

As an additional safety factor, spring clip 64 or another fastener used as a handle may be moved from one aperture to aperture 62 which is closer to the inner end of aperture 66 as shown in FIG. 16. Such movement will tend to limit withdrawal of pin support 56 and prevent withdrawal of slidable pin 50 from its support aperture even in the event spring clip 68 is inadvertently withdrawn from aperture 58.

Figure 11:
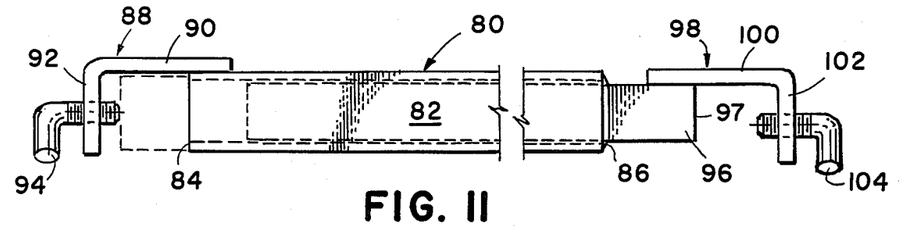
FIG. 11 is a broken side elevation of a brace member incorporated in the present invention.
Figures 12, 13:
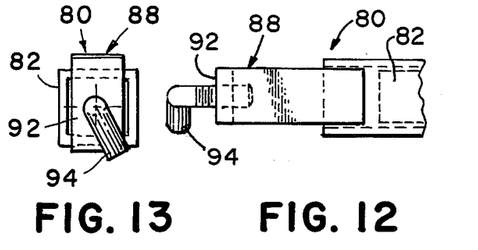
FIG. 12 is a fragmentary top plan view of the left end of the brace member of FIG. 11.
FIG. 13 is an end view of the brace member shown in FIGS. 11 and 12.
Figure 18:
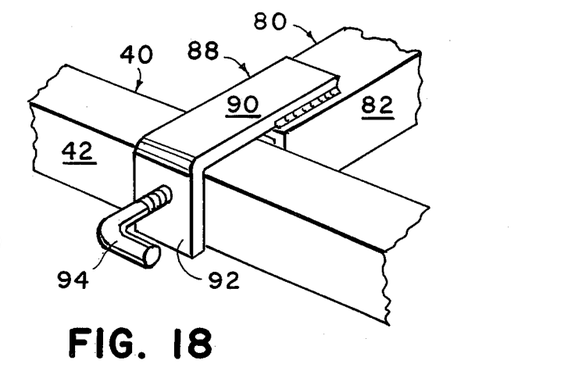
FIG. 18 is a fragmentary, perspective view of the attachment of one of the brace or retaining members to one of the cross members.

As shown in FIGS. 11-13, each of the brace members 80 includes a rigid, elongated hollow tube 82 preferably of square cross section and formed from steel and having end surfaces 84, 86 extending substantially perpendicularly to the axis of elongation of the tube. A releasable clamp assembly is provided at each end 84, 86 of the tube to enable positive attachment and securement of the brace member 80 on a pair of cross members 40 as shown in FIG. 1. At end 84, the releasable clamp includes an L-shaped bracket 88 having an elongated leg 90 welded or otherwise fixed to the top surface of square tube 82 such that it extends parallel to the top surface and outwardly from end 84. Integral flange or shorter leg 92 of bracket 88 is positioned to extend downwardly and parallel to end surface 84. The threaded elbow bolt 94 is mounted through a threaded aperture in the center of flange 92 substantially coaxially with the axis of elongation of tube 82. Hence, as shown in FIG. 18, when fitted over a cross member, the cross member will be received between the end of bolt 94 and the end surface 84 of tube 82 which extends substantially perpendicularly to bolt 94 to allow strong secure, positive clamping of cross member 40 in place within bracket 88 (see FIG. 11).

At the opposite end of brace member 80 is another releasable clamp assembly mounted, in this case however, on a telescoping solid bracket support 96 slidably mounted in the hollow interior of end 86 of tube 82. An L-shaped bracket 98 substantially similar to bracket 88 is welded or otherwise affixed with its longer, elongated leg 100 extending outwardly from and parallel to the top surface of support 96 and its shorter leg 102 extending substantially parallel to the end 97 of support 96. Another elbow bolt 104 is threadably mounted through the center of flange 102 coaxially with the axis of elongation of tube 82. Accordingly, support 96 may be slid inwardly or outwardly from end 86 of tube 82 depending on the spacing between cross members 40 as shown in FIG. 1. As shown in FIG. 18, once bracket 88 is fitted over one cross member, support 96 may be slid inwardly or outwardly to allow bracket 98 to be placed over the second cross member as shown in FIG. 1. Bolts 94, 104 may then be securely tightened to clamp brace member 80 in place on cross members 40 immediately adjacent the cargo to be supported or restrained.

Figure 14:
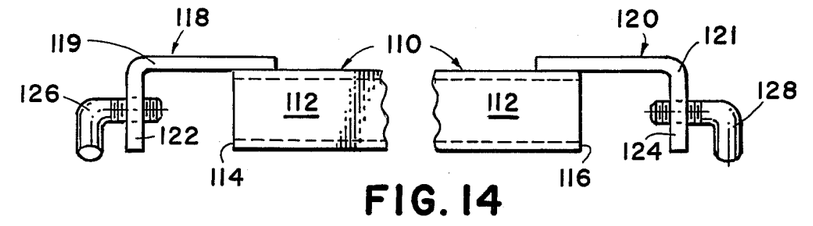
FIG. 14 is a broken side elevation of a rigid retaining member incorporated in the present invention.

As shown in FIGS. 14 and 20-23, an additional element in certain arrangements of the present restraining apparatus is elongated, rigid, retaining member or bar 110 which is adapted to be clamped on a cross member 40 and extend perpendicularly or vertically with respect to the preferred horizontal plane of cross members 40 and brace members 80 to support taller or shorter loads. As shown in FIG. 14, each retaining member or bar has a substantially fixed length generally less than the length of cross members 40 and brace members 80 and includes an elongated hollow tube 112 preferably having a square cross section and formed from steel as with tubes 42, 82. End surfaces 114, 116 of tube 112 extend generally perpendicularly to the axis of elongation of tube 112. Clamping brackets 118, 120, which are substantially similar to brackets 88, 98 in brace members 80, are welded or otherwise affixed to the top surface of tube 112 and extend outwardly therefrom via longer legs 119, 121. Shorter legs 122, 124 extend generally parallel to end surfaces 114, 116 and include threaded elbow bolts 126, 128 extending generally coaxially with the axis of elongation of tube 112 to allow clamping of cross member 40 in either end.

Figure 10:
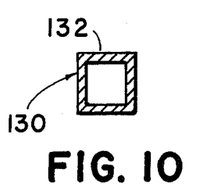
FIG. 10 is a sectional view taken along plane X—X of FIG. 9.

As shown in FIGS. 9, 10 and 20-23, on one end of retaining member or bar 110 is secured on the exterior of a cross member 40, while the opposite or free end of retaining member 110 is available to support a rigid, elongated rectilinear support member or bar 130. Support member 130 is preferably formed from a hollow tube 132 of steel or other similar material and has a generally square cross section as shown in FIG. 10. Support member 130 may be received or clamped in either end of retaining member or bar 110 in bracket 118 or 120. Because retaining member 110 is not slidably extendable or telescoping, it rigidly supports support member or bar 130 above or below cross member 40 as shown in FIGS. 20-23 without the ends of bar 130 engaging any other support element of the truck sides.

In the preferred embodiment of the invention, the dimensions of the principal elements of the invention include generally 1 inch square steel tubes preferably having 12 gauge wall thicknesses for cross members 40, brace members 80, retaining members 110 and support members 130. Side support rails 20 are preferably formed from 1¼ or 1½ by ¼ or ⅜ inch flat cold rolled steel bar in 6, 6½, 7 or 8 foot lengths. Telescoping brace members 80 are preferably formed in overall lengths of 22 inches or 45 inches while retaining members 110 are preferably formed in overall lengths of 8 inches. Support members 130 may be formed in various lengths of 24 or 36 inches to accommodate various cargo.

Figure 19:
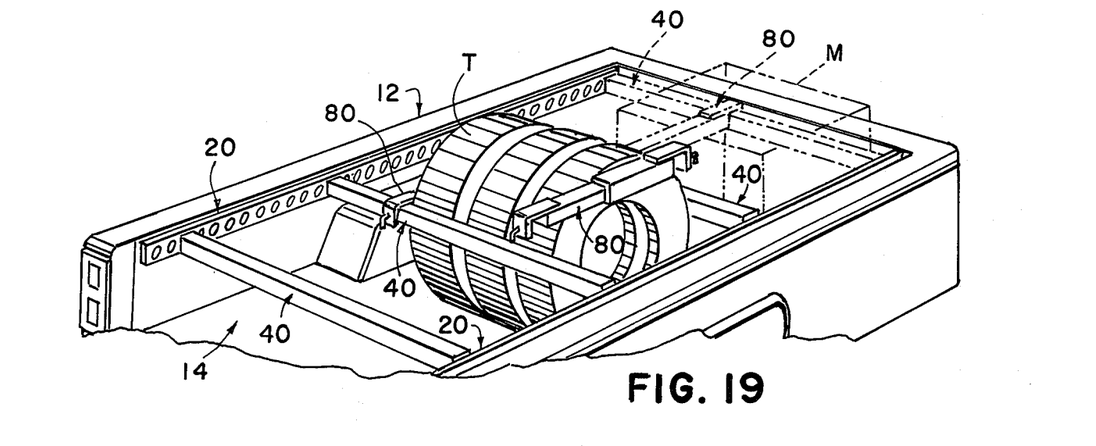
FIG. 19 is a fragmentary, perspective view of the load/cargo retaining apparatus of the present invention in an alternative cargo supporting arrangement.

In addition to the basic arrangement of cross members 40 and brace members 80 on side support rails 20 as shown in FIG. 1, an alternative arrangement is shown in Fig. 19. In this embodiment, a series of three or four cross members 40 may be spaced along the length of side rails 20 in cargo area 14 of pick-up truck 12. A pair of cross members 40 may be positioned at or slightly less than the diameter of a series of tires T which may be supported on their circumferential surfaces and side-by-side one another between the cross members. One brace member 80 is secured at one end of the row of tires T while another brace member 80 may be secured adjacent the opposite end. When so positioned, tires T, which are normally difficult to prevent from shifting within a cargo area in a moving truck, are securely prevented from movement yet easily removable from the cargo area merely by loosening or sliding one brace member away from one end of the row of tires T.

In addition, as shown in FIG. 19, a box or other cargo may be positioned on the opposite side of one cross member against which the row of tires T is fitted. Box M may be fitted adjacent the front of the cargo area immediately behind the cab of the pick-up truck between two cross members and a single brace member 80. Brace member 80 is fitted against one side of box M and holds the other side of the box against one side of the cargo area. Other arrangements of the brace members and cross members can be devised to utilize the entire length of the cargo area and support various sizes and shapes of cargo as desired.

Figure 20:
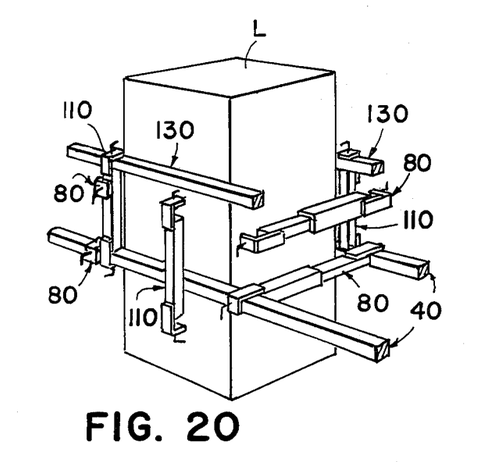
FIG. 20 is a fragmentary, partially exploded perspective view of a third cargo supporting arrangement of the present invention.
Figure 21:
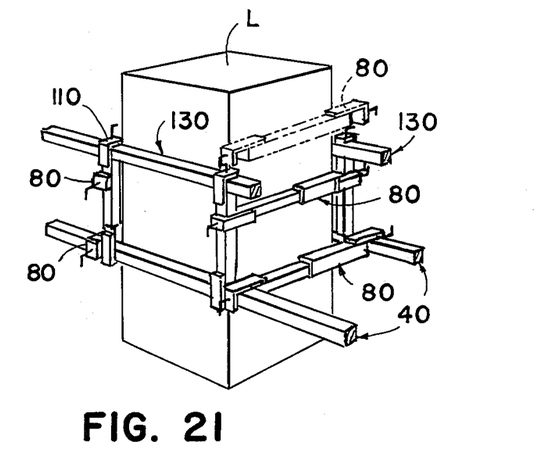
FIG. 21 is a fragmentary, perspective view of the completed cargo supporting arrangement shown in FIG. 20.

As shown in FIGS. 20 and 21, a taller load or cargo can also be supported with the restraining apparatus of the present invention. In this case, an appliance box L for a refrigerator or the like is positioned on cargo floor 16 between a pair of cross members 40. Cross members 40 engage an opposing pair of sides on the box. A pair of brace members 80 is positioned across cross members 40 and adjacent the other opposing sides of the box L. In addition, a pair of retaining members 110 are positioned vertically on the exterior of one cross member 40 to extend above the plane of cross members 40 and brace members 80. One end of each retaining member engages the cross member. In the opposite ends of parallel retaining members 110, which are spaced apart from one another along the one cross member, is secured a rectilinear support member 130. Retaining members 110 are positioned with their clamping brackets 118, 120 opening inwardly toward the box L such that support member 130 is held between the brackets and the box L. On the opposite cross member 40 is a second pair of retaining members 110 spaced apart from one another and supporting a second support member 130 against box L. In addition, third and fourth brace members 80 may be positioned across and between upwardly extending retaining members 110 or, alternately, across and between horizontally extending support members 130 at positions spaced above the plane of cross members 40 and first pair of brace members 80 as shown in FIGS. 20 and 21. Additional brace members 80 secure and rigidify the upwardly extending restraining apparatus which engages box L well above its center of gravity to prevent it from tipping or shifting laterally or longitudinally within the cargo area.

Figure 22:
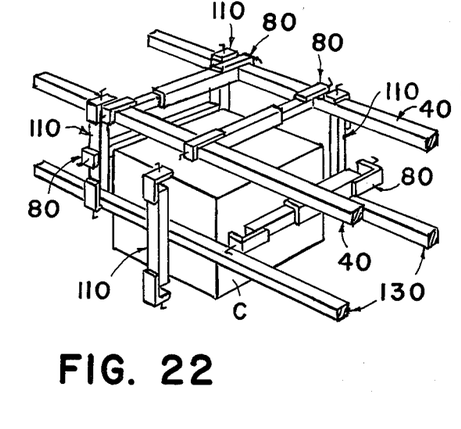
FIG. 22 is a fragmentary, partially exploded perspective view of a fourth arrangement of the cargo restraining apparatus of the present invention.
Figure 23:
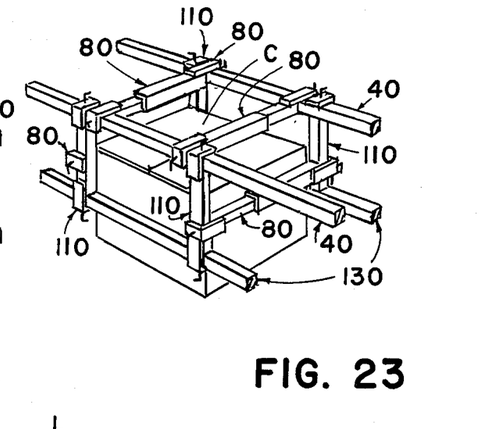
FIG. 23 is a fragmentary, perspective view of the completed cargo restraining arrangement shown in FIG. 22.

In a similar manner to that shown in FIGS. 20 and 21, shorter cargos or loads may also be supported with the present apparatus using retaining members 110 extending downwardly in spaced pairs from a pair of spaced cross members 40 as shown in FIGS. 22 and 23. In this embodiment, cross members 40 are spaced apart slightly greater than the length or width of box C. Two pairs of retaining members 110 are clamped on members 40 at spaced positions adjacent opposing sides of the box C. Support members 130 are secured in the opposite ends of retaining members 110 against those opposing sides of the box. A pair of brace members 80 is then attached between a pair of retaining members including one retaining member in each of the two pairs engaging cross members 40. These rigid brace members 80 are positioned against the opposing end surfaces of box C. Thus, even though box C does not reach the height of the position of cross members 40, it is securely retained against movement in four directions. In order to provide additional strength and rigidity for the apparatus, an additional pair of brace members 80 may be secured between cross members 40 in alignment with the ends of box C to prevent spreading or release of the cross members 40.

As above, other arrangements of the brace members 80, retaining members 110 and support members 130 can also be used to support other sizes and shapes of loads extending both above and below the position of cross members 40. For instance, it would be possible to use retaining members 110 and support members 130 without brace members 80 fitted between cross members 40 (see FIGS. 22, 23). Such an arrangement would be useful for lighter loads unless the clamping brackets 118, 120 were strengthened or brace members 80 were used for heavier loads.

Figure 24:
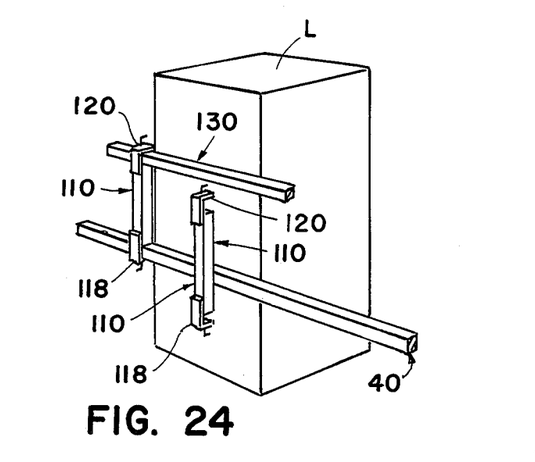
FIG. 24 is a fragmentary, perspective view of a fifth arrangement of the cargo restraining apparatus of the present invention.

It is also possible, as shown in FIG. 24, to use a pair of spaced, elongated retaining members 110 mounted on one of the cross members 40 without additional braces or support structure. These retaining members 110 extend perpendicularly from the plane including the cross member. The brackets 118, 120 at one end of this pair of retaining members 110 are clamped to the cross member 40 and hold one of the support members 130 spaced above or below cross member 40 to support a cargo or load extending above or below that cross member. This arrangement is useful, for example, adjacent the forward end of the truck cargo area where the restraining apparatus will advantageously hold a tall or short load against the front wall of the cargo area.

In addition, in vans or trucks or other vehicles having cargo areas which are taller than the pick-up truck load area shown in FIGS. 1 and 19, additional sets of support rails 20 may be secured one above the other on the sides of the cargo area. In such arrangement, multiple sets of cross members 40, brace members 80, retaining members 110 and support members 130 may be used to support loads extending above or below the level of the cross members on any of the sets of support rails.

In addition, it is also possible to mount side support rails 20 in other orientations besides horizontal, i.e., vertically. In such case, brace members 80 could be mounted across and between cross members supported on different sets of support rails. Moreover, brace members 80 could also be mounted between different sets of cross members mounted on different sets of support rails when more than one set of side rails is positioned horizontally as noted above.

It is also possible to form cross, brace, retaining and support members 40, 80, 110 and 130 with curved or angled portions adapted to correspond more closely to various cargo configurations. Side rails 20 may also be curved to conform to the interior of the cargo area of a vehicle if needed.

While several forms of the invention have been shown and described, other forms will now be apparent to those skilled in the art. Therefore, it will be understood that the embodiments shown in the drawings and described above are merely for illustrative purposes, and are not intended to limit the scope of the invention which is defined by the claims which follow.

The embodiments of the invention in which an exclusive property or privilege is claimed are defined as follows.

1. A load/cargo restraining apparatus for vehicles of the type including a cargo area having opposing upstanding walls and a cargo supporting floor, said apparatus comprising:
   a pair of opposing elongated, rigid support rails extending generally parallel with one another when mounted on the opposing walls of the cargo area of a vehicle, said rails each having a series of support holes extending therethrough at spaced locations therealong; securing means for attaching each of said rails to one of the walls at a position spaced outwardly from that wall; said rails being aligned with one another across the cargo area such that respective pairs of said support holes in said opposing rails are aligned with one another; the space between each of said rails and its respective wall being accessible from adjacent said rails;
   a rigid, elongated, load restraining cross member mounted on and extending between said support rails, said cross member including a pair of mounting pins, one pin mounted on and extending from each end of said cross member, said pins each extending through one support hole in a selected pair of opposing support holes in said rails and into said space between said rail and its respective wall such that the end of each pin is spaced from the wall and accessible in said space;
   removable fastening means mounted on each of said pins in said space between said rail and its respective wall for retaining said pins in said support holes and said cross member on said rails without reliance upon engagement of said pin, or any part of said cross member, or said fastening means with the opposing walls of the vehicle cargo area, said fastening means being accessible for attachment and removal in said space from adjacent and above said rails;
   whereby when a load or cargo is positioned adjacent said cross member in the cargo area, it will be supported and restrained against movement by said cross member and support rails without pressure being exerted by said cross member against the walls of the cargo area.

2. The apparatus of claim 1 including means for slidably mounting at least one of said pins in one end of said cross member whereby said pin may be telescopically extended or retracted for mounting or removing said cross member on or from said rails.

3. The apparatus of claim 2 wherein said cross member is a hollow tube; said means for slidably mounting at least one of said pins include a pin support corresponding in shape to the interior of said tube and having a size larger than said support holes of said rails; said pin being mounted on and extending from an end of said pin support; said pin support being adapted to engage a surface of said support rail adjacent said support holes and being slidably received in the interior of one end of said tube such that said pin extends out of said tube; and limiting means for limiting the sliding movement of said pin support in said tube.

4. The apparatus of claim 3 wherein said limiting means include an elongated aperture extending through the side of said tube and a rigid handle member mounted on said pin support and extending through said aperture, said handle member engaging the ends of said aperture to limit extension and retraction of said pin from the end of said tube.

5. The apparatus of claim 4 wherein said pin support includes a plurality of apertures spaced at successively greater distances from the end of said pin and adapted to register with said aperture in said tube; said handle member being mounted in one of said apertures in said pin support whereby mounting of said handle member in different ones of said pin support apertures enables said pin to be slidably extended and retracted to different distances from the end of said tube.

6. The apparatus of claim 1 wherein said removable fastening means include a pin aperture extending through said pin adjacent its outer end and a resilient spring clip having a length greater than the maximum width of any of said support holes in said rail being mounted in said pin aperture between said rail and its respective wall to prevent withdrawal of said pin from said support hole.

7. The apparatus of claim 1 wherein said securing means include at least one tubular spacer between each of said rails and its respective wall and an elongated fastener extending through said rail and spacer and into the wall of the vehicle.

8. The apparatus of claim 1 including a second of said elongated, rigid, load restraining cross members mounted between a second pair of said support holes in said rails and generally parallel to but spaced from the first of said cross members, said first and second cross members being mounted in a first plane; and an elongated, rigid brace member mounted on and extending between and generally perpendicular to the direction of elongation of said cross members; said brace member being generally in said first plane and including releasable clamping means engaging each of said cross members for retaining said brace member in a desired location on said cross members to resist movement of loads or cargo in said vehicle in a direction generally parallel to said cross members.

9. The apparatus of claim 8 wherein said brace member includes a pair of hollow tubular members one slidably mounted within the other whereby the length of said brace member may be adjusted.

10. The apparatus of claim 8 wherein said releasable clamping means include a bracket on each end of said brace member and a releasable fastener mounted on each of said brackets, said brackets opening in one direction and received over the exterior of said cross members; said fastener in each bracket engaged with a surface of a cross member to retain said bracket and brace member on said cross member.

11. The apparatus of claim 10 wherein said brace member has central axis of elongation; each of said brackets being a rigid L-shaped member extending generally parallel to said axis of said brace member and extending out from the end of said brace member such that one flange of said L-shaped member is spaced from but aligned with the end of said brace member; said releasable fastener including a threaded member extending through said one flange of said L-shaped member generally coaxially with said axis of said brace member to engage and force said cross member against the end of said brace member when said cross member is received between said one flange and the end of said brace member.

12. The apparatus of claim 11 wherein said brace member includes a pair of hollow tubular members one slidably mounted within the other whereby the length of said brace member may be adjusted.

13. The apparatus of claim 11 wherein said cross members are generally square in cross section; said one flange and the end of said brace members being generally parallel to one another; said threaded members and ends of said brace member engaging opposite sides of each of said cross members.

14. The apparatus of claim 8 including a first pair of spaced, elongated, rigid retaining members mounted on at least one of said cross members and extending generally perpendicularly to said first plane; a first, elongated, rigid support member; said retaining members including releasable clamping means for engaging said cross member and for holding said support member in a position spaced from said one cross member whereby a load or cargo extending beyond said first plane may be restrained against movement.

15. The apparatus of claim 14 wherein said support rails, cross members and brace member all extend generally in a first horizontal plane; said retaining members extend generally in a vertical plane; and said additional cross member extends generally in a second horizontal plane spaced from said first horizontal plane.

16. The apparatus of claim 14 including a second pair of said spaced, elongated, rigid retianing members mounted on the other of said cross members and also extending generally perpendicularly to said first plane; a second, elongated, rigid support member; said second pair of retaining members also including releasable clamping means for engaging said other cross member and for holding said second support member in a position spaced from said other cross member; a second elongated, rigid brace member mounted on and extending between either (a) said first and second support members or (b) a pair of said retaining members comprised of one retaining member from each of said first and second pairs of retaining members.

17. The apparatus of claim 1 including a second of said elongated, rigid, load restraining cross members mounted between a second pair of said support holes in said rails and generally parallel to but spaced from the first of said cross members, said first and second cross members being mounted in a first plane; a first pair of spaced, elongated, rigid retaining members mounted on at least one of said cross members and extending generally perpendicularly to said first plane; a first, elongated, rigid support member; said retaining members including releasable clamping means for engaging said cross member and for holding said support member in a position spaced from said one cross member whereby a load or cargo extending beyond said first plane may be restrained against movement.

18. A load/cargo restraining apparatus for vehicles of the type including a cargo area having opposing upstanding walls and a floor, said apparatus comprising:
a pair of opposing elongated, rigid support rails extending generally parallel with one another when mounted on the opposing walls of the cargo area of a vehicle, said rails each having a series of support holes extending therethrough at spaced locations therealong; securing means for attaching each of said rails to one of the walls at a position spaced outwardly from that wall; said rails being aligned with one another across the cargo area such that respective pairs of said support holes in said opposing rails are aligned with one another; the space between each of said rails and its respective wall being accessible from adjacent said rails;
a rigid, load restraining cross member mounted on and extending between said support rails at a selected position along said rails; said support rails and cross member generally extending in a first plane;
removable fastening means for engaging the ends of said cross member to retain said cross member in said position on said rails;
a pair of spaced, elongated rigid retaining members mounted on said cross member and extending generally perpendicular to said first plane; a first, elongated, rigid support member; said retaining members including releasable clamping means for engaging said cross member and for holding said support member in a position spaced from said one cross member whereby a load or cargo extending beyond said first plane may be restrained against movement.

19. The apparatus of claim 18 including a second of said elongated, rigid, load restraining cross members mounted between a second pair of said support holes in said rails and generally parallel to but spaced from the first of said cross members, said first and second cross members being mounted in said first plane; and an elongated, rigid brace member mounted on and extending between and generally perpendicular to the direction of elongation of said cross members; said brace member being generally in said first plane and including releasable clamping means engaging each of said cross members for retaining said brace member in a desired location on said cross members to resist movement of loads or cargo in the vehicle in a direction generally parallel to said cross members.

20. The apparatus of claim 19 including a second pair of said spaced, elongated, rigid retaining members mounted on the other of said cross members and also extending generally perpendicularly to said first plane; a second, elongated, rigid support member; said second pair of retaining members also including releasable clamping means for engaging said other cross member and for holding said second support member in a position spaced from said other cross member; a second elongated, rigid brace member mounted on and extending between either (a) said first and second support members or (b) a pair of said retaining members comprised of one retaining member from each of said first and second pairs of retaining members.

21. The apparatus of claim 19 wherein said releasable clamping means include a bracket on each end of each of said rigid retaining members and said brace member and a releasable fastener mounted on each of said brackets, said brackets opening in one direction and received over the exterior of said cross members; said fastener in each bracket engaged with a surface of a cross member to retain said bracket, said retaining members any brace member on said cross member.

22. The apparatus of claim 19 wherein said brace member includes a pair of hollow tubular members one slidably mounted within the other whereby the length of said brace member may be adjusted.

23. The apparatus of claim 18 wherein said releasable clamping means include a bracket on each end of each of said retaining members and a releasable fastener mounted on each of said brackets, said brackets opening in one direction and received over the exterior of said cross member at spaced locations; said fastener in each bracket engaged with a surface of said cross member to retain said bracket and retaining member on said cross member.

24. The apparatus of claim 23 wherein each of said cross member and retaining members includes a hollow tubular member of generally square cross section.

25. The apparatus of claim 18 wherein said cross member includes a pair of mounting pins, one pin mounted on and extending from each end of said cross member, said pins each extending through one support hole in a selected pair of opposing support holes in said rails and into said space between said rail and its respective wall such that the end of each pin is spaced from the wall and accessible in said space; said removable fastening means including a pin aperture extending through each of said pins adjacent its outer end and a resilient spring clip having a length greater than the maximum width of any of said support holes in said rail being mounted in said pin apertures between said rail and its respective wall to prevent withdrawal of said pin from said support hole.

26. The apparatus of claim 25 including means for slidably mounting at least one of said pins in one end of said cross member whereby said pin may be telescopically extended or retracted for mounting or removing said cross member on or from said rails.

27. A load/cargo restraining apparatus for vehicles of the type including a cargo area having opposing upstanding walls and a floor, said apparatus comprising:
a pair of opposing elongated, rigid support rails extending generally parallel with one another when mounted on the opposing walls of the cargo area of a vehicle, said rails each having a series of support holes extending therethrough at spaced locations therealong; securing means for attaching each of said rails to one of the walls at a position spaced outwardly from that wall; said rails being aligned with one another across the cargo area such that respective pairs of said support holes in said opposing rails are aligned with one another; the space between each of said rails and its respective wall being accessible from adjacent said rails;
a rigid, load restraining cross member mounted on and extending between said support rails at a selected position along said rails; said support rails and cross member generally extending in a first plane;
removable fastening means for engaging the ends of said cross member to retain said cross member in said position on said rails, said fastening means positioned in the space between said support rails and the cargo area walls when said rails are mounted on the cargo area walls such that said cross member is retained on said support rails without reliance upon engagement of said cross member or fastening means with the cargo area walls;
a second of said elongated, rigid, load restraining cross members mounted between a second pair of said support holes in said rails and generally parallel to but spaced from the first of said cross members, said first and second cross members being mounted in a first plane; and an elongated, rigid brace member mounted on and extending between and generally perpendicular to the direction of elongation of said cross members; said brace member being generally in said first plane and including releasable clamping means engaging each of said cross members for retaining said brace member in a desired location on said cross members; whereby said brace member resists movement of loads or cargo in the vehicle in a direction generally parallel to said cross members while said cross members resist movement of loads or cargo in the vehicle in a direction generally parallel to said brace member.

28. The apparatus of claim 27 wherein said releasable clamping means include a bracket on each end of said brace member and a releasable fastener mounted on each of said brackets, said brackets opening in one direction and received over the exterior of said cross members; said fastener in each bracket engaged with a surface of a cross member to retain said bracket and brace member on said cross member.

29. The apparatus of claim 28 wherein said brace member includes a pair of hollow tubular members one slidably mounted within the other whereby the length of said brace member may be adjusted.

30. The apparatus of claim 27 wherein said cross member incldues a pair of mounting pins, one pin mounted on and extending from each end of said cross member, said pins each extending through one support hole in a selected pair of opposing support holes in said rails and into said space between said rail and its respective wall such that the end of each pin is spaced from the wall and accessible in said sapce; said removable fastening means including a pin aperture extending through each of said pins adjacent its outer end and a resilient spring clip having a length greater than the maximum width of any of said support holes in said rail being mounted in said pin apertures between said rail and its respective wall to prevent withdrawal of said pin from said support hole.

31. The apparatus of claim 30 including means for slidably mounting at least one of said pins in one end of said cross member whereby said pin may be telescopically extended or retracted for mounting or removing said cross member on or from said rails.

32. A kit for assembling a load/cargo restraining apparatus for vehicles having opposing upstanding walls and a cargo supporting floor, said kit comprising:
   a pair of elongated, rigid support rails extending in opposition to and generally parallel with one another when mounted on the opposing walls of the cargo area of a vehicle, said rails each having a series of support holes extending therethrough at spaced locations therealong; said rails adapted to be aligned with one another across the cargo area such that respective pairs of said support holes in said opposing rails are aligned with one another;
   securing means for attaching each of said rails to one of the walls at a position spaced outwardly from that wall, the space between each of said rails and its respective wall when said rails are mounted being accessible from adjacent and above said rails;
   an elongated, rigid, load restraining cross member adapted to be mounted on and to extend between said support rails when mounted on the walls of the cargo area, said cross member including a pair of mounting pins, one pin mounted on and extending from each end of said cross member, said pins each adapted to extend through one support hole in a selected pair of opposing support holes in said rails and into the space between said rail and its respective wall such that the end of each pin is spaced from the wall and is accessible in that space;
   removable fastening means for mounting on each of said pins in the space between said rail and its respective wall to retain the pins in said support holes and said cross member on said rails without reliance upon engagement of said pin, or any part of said cross member, or said fastening means with the opposing walls of the vehicle cargo area, said fastening means adapted for access for attachment and removal in the space from adjacent and above the rails when said rails are mounted on said cargo area walls;
   whereby when assembled in a vehicle and a load or cargo is positioned adjacent said cross member in the cargo area, the cargo will be supported and restrained against movement by said cross member and support rails without pressure being exerted by said cross member on the walls of the cargo area.

33. The apparatus of claim 32 including means for slidably mounting at least one of said pins in one end of said cross member whereby said pin may be telescopically extended or retracted for mounting or removing said cross member on or from said rails.

34. The apparatus of claim 33 wherein said cross member is a hollow tube; said means for slidably mounting at least one of said pins include a pin support corresponding in shape to the interior of said tube; said pin being mounted on and extending from an end of said pin support; said pin support being slidably received in the interior of one end of said tube such that said pin extends out of said tube; and limiting means for limiting the sliding movement of said pin support in said tube.

35. The apparatus of claim 34 wherein said limiting means include an elongated aperture extending through the side of said tube and a rigid handle member mounted on said pin support and extending through said aperture, said handle member engaging the ends of said aperture to limit extension and retraction of said pin from the end of said tube.

36. The apparatus of claim 35 wherein said pin support includes a plurality of apertures spaced at successively greater distances from the end of said pin and adapted to register with said aperture in said tube; said handle member being mounted in one of said apertures in said pin support whereby mounting of said handle member in different ones of said pin support apertures enables said pin to be slidably extended and retracted to different distances from the end of said tube.

37. The apparatus of claim 32 wherein said removable fastening means include a pin aperture extending through said pin adjacent its outer end and a resilient spring clip having a length greater than the maximum width of any of said support holes in said rail being mounted in said pin aperture between said rail and its respective wall to prevent withdrawal of said pin from said support hole.

38. The kit of claim 32 wherein said securing means include at least one tubular spacer adapted to fit between each of said rails and its respective wall and an elongated fastener adapted to extend through said rail and spacer and into the wall of the vehicle.

39. The kit of claim 32 including a second of said elongated, rigid, load restraining cross members adapted to be mounted between a second pair of said support holes in said rails and generally parallel to but spaced from the first of said cross members, said first and second cross members adapted to be mounted in a first plane; and an elongated, rigid brace member adapted to be mounted on and to extend between and generally perpendicular to the direction of elongation of said cross members; said brace member adapted to be generally in said first plane and including releasable clamping means for engaging each of said cross members to retain said brace member in a desired location on said cross members to resist movement of loads or cargo in the vehicle in a direction generally parallel to said cross members.

40. The kit of claim 39 wherein said brace member includes a pair of hollow tubular members one slidably mounted within the other whereby the length of said brace member may be adjusted.

41. The kit of claim 39 wherein said releasable clamping means include a bracket on each end of said brace member and a releasable fastener mounted on each of said brackets, said brackets opening in one direction and adapted to be received over the exterior of said cross members; said fastener in each bracket adapted to be engaged with a surface of a cross member to retain said bracket and brace member on said cross member.

42. The kit of claim 39 including a first pair of spaced, elongated, rigid retaining members adapted to be mounted on at least one of said cross members and to extend generally perpendicularly to said first plane; a first, elongated, rigid support member; said retaining members including releasable clamping means for engaging said cross member and for holding said support member in a position spaced from said one cross member whereby a load or cargo extending beyond said first plane may be restrained against movement.

43. The kit of claim 42 including a second pair of said spaced, elongated, rigid retaining members adapted to be mounted on the other of said cross members and to also extend generally perpendicularly to said first plane; a second, elongated, rigid support member; said second pair of retaining members also including releasable clamping means for engaging said other cross member and for holding said second support member in a position spaced from said other cross member; a second elongated, rigid brace member adapted to be mounted on and to extend between either (a) said first and second support members or (b) a pair of said retaining members comprised of one retaining member from each of said first and second pairs of retaining members.

44. A load/cargo restraining apparatus for vehicles of the type including a cargo area having opposing upstanding walls and a floor, said apparatus comprising:

a pair of opposing elongated, rigid support rails extending generally parallel with one another when mounted on the opposing walls of the cargo area of a vehicle, said rails each having a series of support holes extending therethrough at spaced locations therealong; securing means for attaching each of said rails to one of the walls at a position spaced outwardly from that wall; said rails being aligned with one another across the cargo area such that respective pairs of said support holes in said opposing rails are aligned with one another; the space between each of said rails and its respective wall being accessible from adjacent said rails;

a first rigid, load restraining cross member mounted on and extending between said support rails at a selected position along said rails; said support rails and cross member generally extending in a first plane;

a first pair of spaced, elongated rigid retaining members mounted on said cross member and extending generally perpendicular to said first plane; a first, elongated, rigid support member; said retaining members including releasable clamping means for engaging said cross member and for holding said support member in a position spaced from said one cross member whereby a load or cargo extending beyond said first plane may be restrained against movement;

a second of said elongated rigid, load restraining cross mmebers mounted on and extending between said support rails and generally parallel to but spaced from the first of said cross members, said first and second cross members being mounted in said first plane;

removable fastening means for engaging the ends of each of said cross members to retain said cross members in said positions on said rails;

a second pair of said spaced, elongated, rigid retaining members mounted on said second cross member and also extending generally perpendicularly to said first plane; a second, elongated, rigid support member; said second pair of retaining members also including releasable clamping means for engaging said other cross member and for holding said second support member in a position spaced from said other cross member;

an elongated, rigid brace member interchangeably mounted on and extending beween either (a) said first and second support members or (b) a pair of said retaining members comprised of one retaining member from each of said first and second pairs of retaining members.

* * * * *

UNITED STATES PATENT AND TRADEMARK OFFICE
CERTIFICATE OF CORRECTION

PATENT NO. : 4,772,165

DATED : September 20, 1988

INVENTOR(S) : Jimmie Bartkus

It is certified that error appears in the above-identified patent and that said Letters Patent is hereby corrected as shown below:

Column 6, line 33:

"cylinder" should be --cylindrical--.

Column 7, line 19:

"tha" should be --than--.

Column 13, claim 16, line 58:

"retianing" should be --retaining--.

Column 16, claim 30, line 58:

"sapce" should be --space--.

Signed and Sealed this

Twenty-eighth Day of March, 1989

*Attest:*

DONALD J. QUIGG

*Attesting Officer*   *Commissioner of Patents and Trademarks*